United States Patent
Leblond et al.

(10) Patent No.: US 6,564,628 B1
(45) Date of Patent: May 20, 2003

(54) COMBINED STANDBY INSTRUMENTS FOR AIRCRAFT

(75) Inventors: Henri Leblond, Versailles (FR); Jean-René Chevalier, Cenon s/Vienne (FR); Edouard Escobar, Villiers /Loir (FR)

(73) Assignee: Thomson-CSF Sextant, Velizy Cillacoublay (FR)

( * ) Notice: Subject to any disclaimer, the term of this patent is extended or adjusted under 35 U.S.C. 154(b) by 0 days.

(21) Appl. No.: 09/806,489

(22) PCT Filed: Oct. 8, 1999

(86) PCT No.: PCT/FR99/02418

§ 371 (c)(1),
(2), (4) Date: Apr. 12, 2001

(87) PCT Pub. No.: WO00/22382

PCT Pub. Date: Apr. 20, 2000

(30) Foreign Application Priority Data

Oct. 13, 1998 (FR) .............................. 98 12809

(51) Int. Cl.$^7$ .............................................. G01C 21/00
(52) U.S. Cl. ..................................................... 73/178 R
(58) Field of Search ....................... 73/178 R, 180–783, 73/170.02, 202, 195, 196, 861.65, 861.66, 861.68, 170.07, 170.08, 170.09, 170.06; 244/1 R, 117 R, 121, 129.1; 340/971–978

(56) References Cited

U.S. PATENT DOCUMENTS

| | | | |
|---|---|---|---|
| 4,598,292 A | | 7/1986 | Devino |
| 5,229,956 A | * | 7/1993 | Daniell et al. ............... 702/175 |
| 5,335,177 A | * | 8/1994 | Boiteau et al. ................ 701/14 |
| 5,406,839 A | | 4/1995 | Leblond et al. |
| 6,038,932 A | * | 3/2000 | Wandel et al. ........... 73/861.65 |

FOREIGN PATENT DOCUMENTS

| | | |
|---|---|---|
| FR | 2 569 848 | 3/1986 |
| FR | 2 725 033 | 3/1996 |
| JP | 63-091510 | 4/1988 |

OTHER PUBLICATIONS

U.S. patent application Ser. No. 09/806,489, filed Apr. 12, 2001, pending.
U.S. patent application Ser. No. 09/889,578, filed Jul. 31, 2001, pending.

* cited by examiner

*Primary Examiner*—William Oen
(74) *Attorney, Agent, or Firm*—Oblon, Spivak, McClelland, Maier & Neustadt, P.C.

(57) ABSTRACT

The present invention relates to back-up instruments for aiding the piloting of an aircraft, which instruments are intended to provide, with high security of operation, indications relating to the pressure altitude, the conventional speed and the attitude (angles of roll and of pitch) of the aircraft, this being for the purpose of serving both as reference for the control of the proper operation of the main systems of on-board and back-up instruments in the event of a fault with the main system or systems of on-board instruments. It relates more particularly to combined back-up instruments including an electronic portion endowing them with a degree of calculational power. It consists in providing, in these combined back-up instruments which operate exclusively on the basis of measurements of total pressure and of static pressure and inertial measurements originating from their own sensors, a correction of the static pressure measurement error due to the aerodynamic angle of incidence of the aircraft as computed solely on the basis of the information already at the disposal of these back-up instruments, doing so in order to improve the accuracy of the indication of pressure altitude without thereby increasing the cost or reducing the safety of operation of the combined back-up instruments.

2 Claims, 3 Drawing Sheets

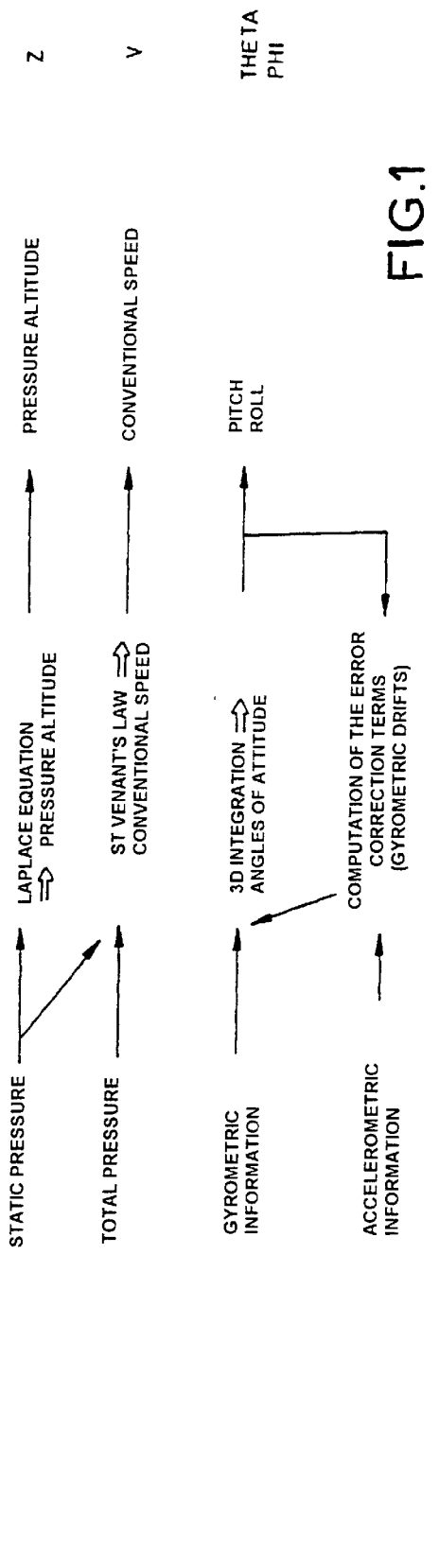
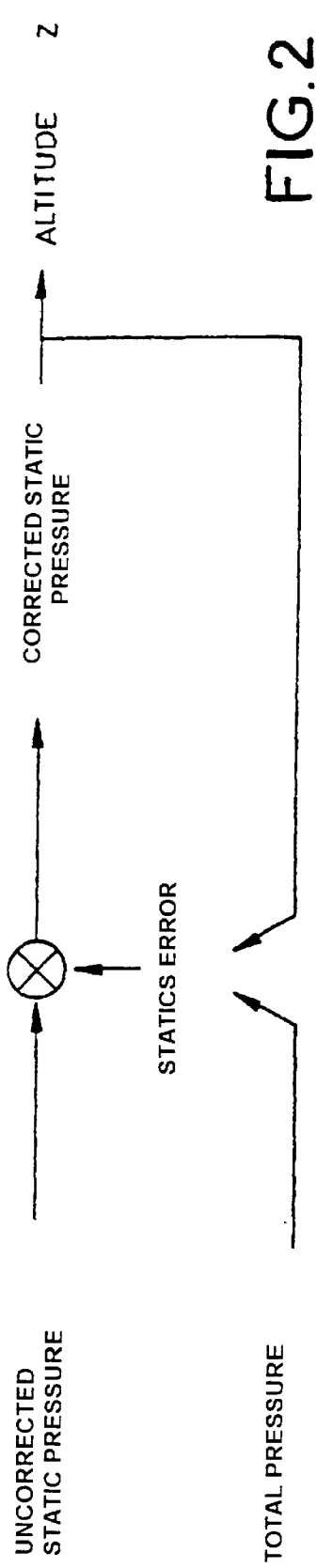

COMBINED STANDBY INSTRUMENTS FOR AIRCRAFT

BACKGROUND OF THE INVENTION

The present invention relates to back-up instruments which deliver a minimum of three critical items of information to the pilots of an aircraft, in the event of a failure of the main instruments, these items being: the speed of the aircraft relative to the air or conventional speed deduced from a measurement of dynamic pressure, the altitude of the aircraft deduced from a measurement of static pressure and the attitude of the aircraft obtained on the basis of information originating from inertial sensors.

The conventional speed is the image of the dynamic pressure on which the lift depends. In particular, it enables the pilot of an aeroplane to decide the instant of take-off and to estimate his safety margin with respect to the risk of stalling or of abrupt loss of lift.

The altitude is used differently depending on the phases of flight. When cruising, the aeroplane must comply with the air corridor allocated to it and, to do so, must maintain a given flight level defined in terms of a standard altitude or pressure altitude. The standard altitude or pressure altitude is a theoretical altitude deduced from the measurement of the static pressure and translated into a theoretical height after making a number of assumptions regarding the physical properties of the atmosphere in which the aircraft is flying. It is very different from the actual altitude relative to the ground or to sea level. The disparities may reach several thousand feet but the indication provided in terms of relative value for one and the same place is very accurate and leads to a very safe definition of the air corridors since all the aircraft use the same model of the atmosphere.

The flight levels or corridors allocated to the aircraft by the air traffic controllers have a height which takes account of the accuracy of measurement of the standard altitude or pressure altitude. For example, above the level 290 corresponding to 29,000 feet, an air corridor has a height of 1000 feet whereas the accuracy of measurement of the standard altitude or pressure altitude is better than 100 feet. The risk of collision is therefore almost zero.

In the event of inadequate visibility, the pilot must be furnished with a vertical reference, given by an attitude indicator, in order to fly the aircraft in complete safety and avoid placing the aircraft into an attitude which is prohibited by the construction specifications of the machine.

These three basic items of information, regarded as critical in the safety sense, are provided to the pilot and to the copilot of an aircraft in a redundant form so that the probability of total loss or of erroneous information is almost zero. For aircraft which are required to transport passengers, it is the rule that the on-board instruments providing this basic information are triplicated. On board there are, almost routinely, three independent sets of instruments: a first for the pilot, a second for the copilot and a third as back-up. The pilot and the copilot are each furnished with their own set of instruments together with so-called main displays based on cathode-ray tubes or liquid crystals whilst the back-up set of instruments is arranged on a central console separating the pilot's seat from the copilot's seat.

The back-up instruments need not be quite as accurate as the main instruments intended for the pilot and for the copilot since, normally, they merely serve as reference for testing the proper operation of the main instruments. But they must however exhibit very high operational reliability.

Until very recently, the reliability of the back-up instruments was based on purely mechanical or pneumatic embodiments not requiring recourse to the on-board electrical supply network or to the mount on the outside of the fuselage of measurement probes other than pressure probes, with no moving parts, connected up by pneumatic ducting. Conversely, in order to improve the accuracy of the indications provided, the embodiments of the instruments of the main systems are calling upon an ever larger portion of electronics involving the use of the on-board electrical supply network and upon various measurement probes, including aerodynamic incidence probes, which are mounted on the outside of the fuselage of the aircraft and enclose electromechanical sensors requiring electrical cable wiring. The reliability of the main instrument systems is affected by the reliability of the on-board electrical network and of the non-purely static measurement probes used on the outside of the fuselage. It is also affected by a degree of sensitivity to the radioelectric disruptions of the environment of the aircraft such as lightning strikes due to the presence of the electrical cable wiring connecting the instruments to certain measurement probes placed outside the fuselage.

In view of these considerations, the search for the greatest possible safety of operation has hitherto led to the use as back-up instruments of: a pneumatic altimeter, a mechanical anemometer or "air speed indicator" and an attitude indicator or gyroscopic "artificial horizon".

The current technological advances have now made it possible to attain a level of safety in respect of the electrical supply network of an aircraft such that it can be presumed that an electrical power source will always be available on board for a minimum of instruments and equipment regardless of the failure conditions encountered. This is why the introduction of electronics into the back-up instruments has recently been planned so as to improve their accuracy and reduce their maintenance costs, without thereby affecting their safety of operation. In particular, it is envisaged to replace the three purely mechanical and pneumatic conventional back-up instruments with fully electronic combined instruments which provide on a liquid crystal screen the three critical items of information with regard to the conduct of a flight, namely: the pressure altitude, the conventional speed and the attitude of the aircraft. However, in order to ensure a high level of safety, it still remains necessary to maintain complete independence between the system of back-up instruments and the systems of main instruments for the pilot and the copilot and also to avoid the system of back-up instruments having recourse to measurement probes mounted on the outside of the fuselage of the aircraft which are not purely static or require connection by electrical wiring. This leads to the system of back-up instruments keeping its own measurement portions and its customary measurement probes. Thus, the system of back-up instruments will still possess its own inertial means for determining the attitude of the aircraft relative to the vertical and its own measurement portions linked to pneumatic measurement probes for determining the conventional speed and the pressure altitude.

The inertial means of the system of back-up instruments consist, for example, of a gyroscopic top slaved to the apparent vertical by an erector device which maintains a vertical reference accurate to within a few tenths of a degree, it being possible to synthesize this gyroscopic top by means of inertial sensors of angular velocity and of accelerometers or inclinometers.

The conventional speed measurement portion of the system of back-up instruments deduces, in a standard manner, the conventional speed from the dynamic pressure which is the difference between the total pressure and the static pressure, by implementing St Venant's law or Rayleigh's supersonic equation.

The portion for measuring the pressure altitude of the system of back-up instruments deduces, in a standard manner, the pressure altitude from the static pressure, by applying the benchmark relations arising from the Laplace equations for the standard atmosphere.

The measurements of total pressure and static pressure on behalf of the system of back-up instruments are made independently of the main systems of instruments for the pilot and the copilot, the total pressure being measured with the aid of a specific pressure sensor linked to a Pitot tube installed on the fuselage of the aircraft parallel to its longitudinal axis whereas the static pressure is measured with the aid of another specific pressure sensor linked to a particular air intake which is influenced as little as possible by the aerodynamic field of the aircraft.

The total pressure is easy to measure since it corresponds very accurately to the pressure measured at the bottom of a Pitot tube, as soon as this tube is aligned approximately in the direction of the airflow over the fuselage of an aircraft. The accuracy is better than 1% in the subsonic flight domain.

The static pressure around an aircraft is disturbed by the presence of the aircraft itself since the aerodynamic field of the aircraft modifies the pressure around its fuselage. This modification is approximately proportional to the square of the speed of the local flow. To measure the static pressure, two types of air intake are mainly used. Those of one type consist of orifices drilled in the very surface of the fuselage of the aircraft, usually towards the front of the fuselage. Those of the other type form part of a special anenometric antenna or static Pitot probe.

The disparity between the true static pressure and the static pressure given by a static pressure intake on an aircraft is mainly dependent on the location of the intake on the aircraft, on the sideslip, on the Mach number and on the aerodynamic angle of incidence of the aircraft. This disparity is characterized by a coefficient termed the "statics coefficient", of the same nature as the pressure coefficient employed for the study of the pressure distributions around the profiles.

To reduce the statics disparity, modern aircraft are equipped either with fuselage static intakes with aerodynamic correction of the statics error by means of a particular profiling of the surface of the fuselage in the immediate neighbourhood of the air intake, or with static Pitot probes aerodynamically compensated by a particular profiling of the tube of the probe and by lateral auxiliary orifices.

In the latter case, the probe is defined in such a way as to exhibit a degree of sensitivity to the variations in the local aerodynamic angle of incidence, this sensitivity being calculated in such a way as to compensate for the variations of the local aerodynamic field as seen by the probe at the location adopted on the fuselage or at some other specific spot.

The tailoring of the shape of an aerodynamically compensated static Pitot probe is difficult since the aerodynamic field depends on the flight conditions and, to a lesser extent, on the configuration of the aircraft (position of the control surfaces, of the landing gear etc.). In practice, a static pressure intake on an aircraft always remains prone to a systematic measurement error dependent, in essence, outside of the phases of dynamic flight, on the sideslip of the aircraft, on the Mach number and on the aerodynamic angle of incidence of the aircraft.

It is known practice to combat the influence of the sideslip by mixing the pressure information arising from two static pressure probes arranged on each side, right and left, of the fuselage of the aircraft.

It is also known practice to take account of the Mach number and of the aerodynamic angle of incidence of the aircraft by applying, to the measured value of static pressure, a correction factor of which the value is chosen as a function of the Mach number and of the aerodynamic angle of incidence of the aircraft according to laws defined during the design of the aircraft and its early flight trials.

Hitherto, the correcting of the static pressure measurement as a function of the Mach number and of the aerodynamic angle of incidence of the aircraft has not been done in the system of back-up instruments which are purely mechanical. It has been done solely by the calculators of the pilot's and copilot's main systems of instruments which derive the Mach number from the ratio prevailing between the measured total pressure and the measured static pressure and which receive the value of the aerodynamic angle of incidence from one or more incidence probes or vanes placed on the flanks of the aircraft.

The introduction of an electronic portion into the system of back-up instruments for the control of an aircraft makes it possible to correct the static pressure measured as a function of the Mach number and of the aerodynamic angle of incidence of the aircraft for a better assessment of the barometric altitude. However, it requires knowledge of the aerodynamic angle of incidence of the aircraft, which can no longer be obtained from an incidence probe based on the flanks of the aircraft, for safety reasons, this probe possibly being out of use in the event of an avionic failure and possibly even inducing failures in the system of back-up instruments by propagating a lightning strike by virtue of its electrical connection.

BRIEF SUMMARY OF THE INVENTION

The aim of the present invention is to solve this difficulty. Its aim is more particularly to improve the accuracy of the back-up instruments of an aircraft without however increasing the cost thereof or decreasing the safety of operation thereof.

Its subject is combined back-up instruments for aircraft delivering indications regarding the conventional speed, the standard altitude and the attitude of the aircraft and accordingly comprising:

two pneumatic inlets for measuring pressure, one for the total pressure, intended to be connected up to a total pressure probe mounted on the aircraft, and the other for the static pressure, intended to be connected up to a static pressure probe, an electronic portion for measuring total pressure equipped with an electronic pressure sensor connected up to the pneumatic inlet dedicated to the total pressure, an electronic portion for measuring static pressure equipped with an electronic pressure sensor connected up to the pneumatic inlet for static pressure, an electronic portion for inertial measurements, equipped with gyrometric and accelerometric or inclinometric inertial sensors, an electronic calculator deducing an indication of conventional speed from the total pressure and static pressure information provided by the electronic portions for measuring total pressure and static pressure, an indication of standard altitude from the static pressure information provided by the electronic portion for measuring static pressure and indications regarding the attitude of the aircraft (angle of pitch θ and angle of roll ϕ) relative to a vertical reference direction from the information provided by the electronic portion for inertial measurements, optoelectronic means of display of the indications of conventional speed, of standard altitude and of attitude which are provided by the electronic calculator, these combined back-up instruments being characterized in that the electronic calculator furthermore comprises:

electronic means for computing the aerodynamic angle of incidence α of the aircraft operating on the basis of the indication of pitch attitude (angle of pitch θ of the aircraft), of the indication of conventional speed and of the indication of pressure altitude which are delivered by the electronic calculator, and electronic means of correcting the static pressure information provided by the electronic portion for measuring static pressure taking into account a correction coefficient dependent on the indication of aerodynamic angle of incidence α of the aircraft as delivered by the electronic means for computing the aerodynamic angle of incidence.

Advantageously, the calculator of the combined back-up instruments furthermore comprises electronic means for computing the Mach number operating on the basis of the ratio of the total pressure derived from the total pressure information provided by the electronic portion for measuring total pressure to the static pressure derived from the static pressure information provided by the electronic portion for measuring static pressure, the electronic means of correcting the static pressure information provided by the electronic portion for static pressure taking into account a correction coefficient dependent both on the indication of aerodynamic angle of incidence of the aircraft as delivered by the electronic means of computing the aerodynamic angle of incidence a and of the Mach number indication delivered by the electronic means of computing the Mach number.

BRIEF DESCRIPTION OF THE DRAWINGS

Other characteristics and advantages of the invention will emerge from the description hereinbelow of an embodiment given by way of example. This description will be given in conjunction with the drawing in which:

FIG. 1 illustrates, in schematic form, the general principles of the calculations to be performed on the basis of the measurements of the total and static pressures, and of the gyrometric and accelerometric or inclinometric measurements so as to obtain the control information, namely the pressure altitude, the conventional speed and the angles of pitch and of roll, FIG. 2 illustrates in schematic form a first possible correction of the measurement of the static pressure when the error is considered to be elated to the speed alone.

DETAILED DESCRIPTION OF THE INVENTION

Figure 3:
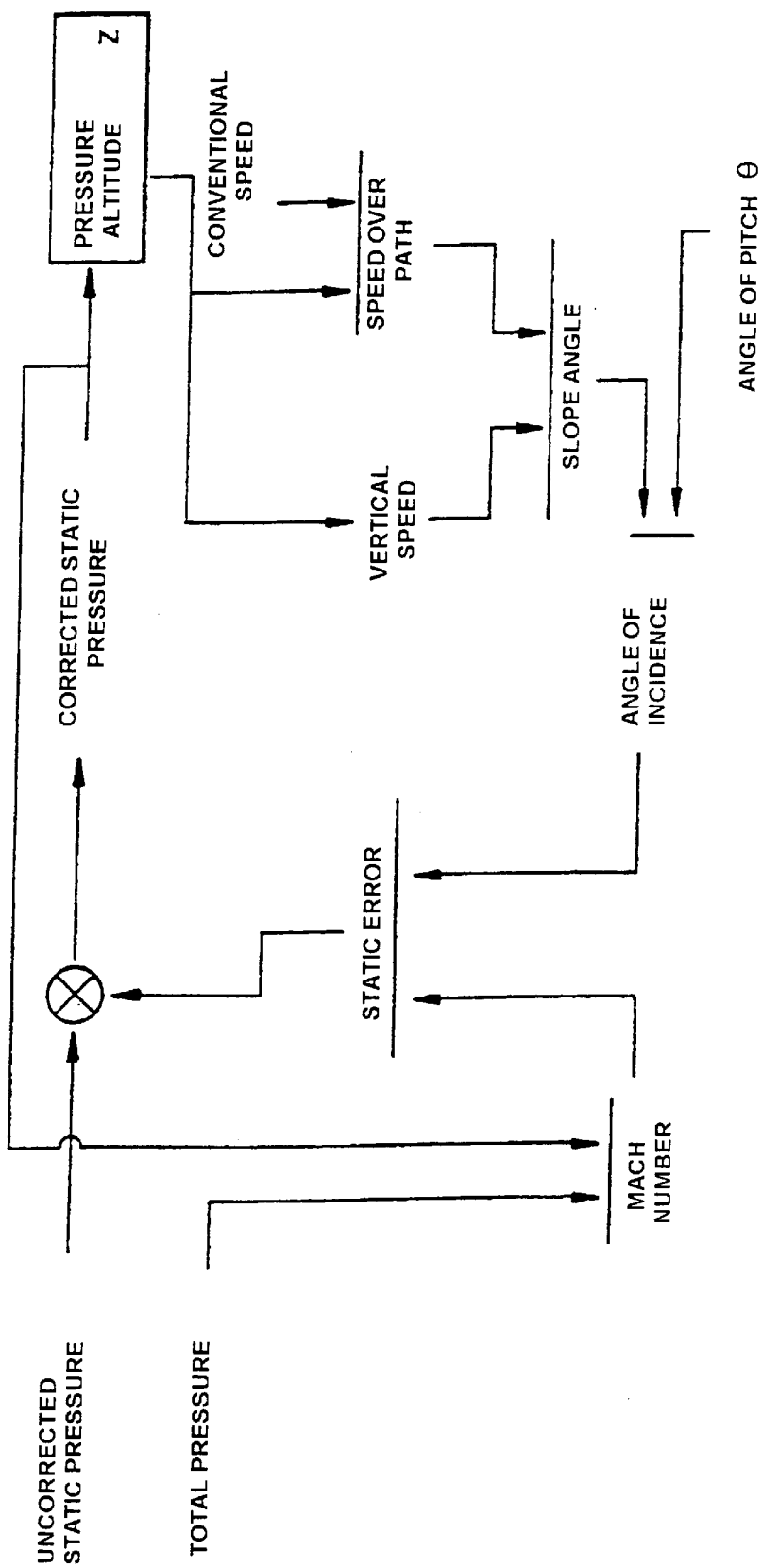
FIG. 3 illustrates, in schematic form, a second possible correction of the static pressure measurement taking account not only of the error due to the speed but also of that due to the aerodynamic angle of incidence, and FIG. 4 diagrammatically represents the architecture of a system of combined back-up instruments for aircraft in accordance with the invention.

As was seen earlier, in order for there to be an acceptable safety level on board an aircraft, it is necessary for the on-board instruments to be capable of providing the pilot, at any instant and regardless of the circumstances, with a minimum of indications as to the standard attitude of the aircraft, its conventional speed and its attitude with respect to a vertical reference axis. To achieve this result, on board an aircraft transporting passengers, use is made of redundancy, by equipping the aircraft with three independent systems of instruments: a first main system of instruments which is intended for the pilot, a second main system of instruments intended for the copilot and a third system of back-up instruments which each provide these quantities, independently of the others. The two main systems of instruments are scheduled to be used customarily by the pilot and the copilot and must therefore be as complete and as accurate as possible. They then display, with high accuracy, the three aforesaid items of information from among a multitude of others. The system of back-up instruments is scheduled only so as to serve, in normal times, as reference for the control of the proper operation of the main systems of instruments and so as to be used as back-up, in an exceptional manner, in the event of a failure with one or both main systems of instruments. In this regard, it need not be complete nor have the same accuracy as the main systems of instruments. It is sufficient for it to display the three essential items of information, viz. pressure altitude, conventional speed and attitude, with average accuracy, but it must have very high safety of operation owing to its reference function and back-up function.

For the determination of the pressure altitude, of the conventional speed and of the attitude of the aircraft, a system of back-up instruments, like any system of on-board instruments, employs classical methods known to the art of aeronautics.

To obtain the value of the pressure altitude, it undertakes a measurement of static pressure to which it applies benchmark relations arising from the Laplace equations for the standard atmosphere.

To obtain the value of the conventional speed, it undertakes measurements of the total pressure and of the static pressure and applies St Venant's equation or Rayleigh's supersonic equation to the difference between the total pressure obtained and the static pressure obtained.

For further details on these methods of determining the pressure altitude and the conventional speed of an aircraft, reference may be made to the following works:

[1] Jean IDRAC "Instruments de bord." [On-board instruments] 1954 Ecole supérieure de l'Aéronautique,

[2] Pierre REBUFFET "Aérodynamique expérimentale." [Experimental aerodynamics] 1950 Ecole supérieure de l'Aéronautique,

[3] M. KAPTON & W. R. FRIED "Avionics Navigation Systems" 1997 John Wiley & Sons Inc.

To evaluate the attitude, a system of back-up instruments calls, as is often the case, upon inertial sensors which are three gyrometers or sensors of angular velocity along the three axes, and accelerometers or inclinometers associated with the three gyrometers. The integration of the angular velocities delivered by the gyrometers, by classical methods which generally call upon quaternions, gives the values of the angles of roll ϕ and of pitch θ of the aircraft whilst the drifting due to the defects of the gyrometers is compensated for by estimating the apparent vertical on the basis of the information given by the accelerometers or inclinometers.

For further details on the way of evaluating the attitude of an aircraft from the information arising from inertial sensors, reference may be made to the French patent published under No. 2 614 694, and filed by the SFENA and entitled "Centrale d'attitude intégrée pour aérodyne." [Integrated attitude control unit for aerodyne].

FIG. 1 summarizes, in a schematic, these various classical methods for determining the pressure altitude, the conventional speed and the attitude of an aircraft which are used by most present-day on-board instrument systems.

The requirement for very high safety of operation spurs one to seek, for a system of back-up instruments, total independence with regard to the other items of equipment of the aircraft, thereby leading to its being equipped with its own total pressure intake and static pressure intake, and its own inertial sensors.

As was seen earlier, the total pressure intake does not pose any problem since the total pressure corresponds, with very good accuracy, to the pressure measured at the bottom of a Pitot tube. The same is not true for the static pressure intake which suffers from the fact that the static pressure measured around an aircraft is disturbed by the presence of the aircraft.

Regardless of the precautions taken in the design of the static pressure probe and its disposition on the fuselage of the aircraft, there is still a systematic error in the static pressure measurement impairing the accuracy of the resulting pressure altitude indication. This systematic error is due to the influence of the aerodynamic field of the aeroplane and depends mainly on the sideslip of the aircraft, on the Mach number and on the aerodynamic angle of incidence of the aircraft.

The influence of the sideslip is combated by mixing the pressure information arising from two static pressure probes disposed on each side, right and left, of the fuselage of the aircraft.

The influences of the Mach number and of the aerodynamic angle of incidence of the aircraft can be taken into account only by means of a correction factor whose value varies as a function of the Mach number and of the aerodynamic angle of incidence according to laws determined during the engineering design of the aircraft and its flight trials.

A first approximation consists in taking into consideration only the influence of the Mach number. This amounts to writing that the difference $\delta_{P_s}$ between the measured static pressure $P_s$ and the actual static pressure $P_{s\infty}$:

$$\delta_{P_s} = P_s - P_{s\infty}$$

is a function of the ratio of the total pressure $P_T$ to the measured static pressure $P_s$, and of the dynamic pressure $P_T - P_s$:

$$\delta_{P_s} = f_1(P_T/P_s, P_T - P_s)$$

which function is defined by a table of values established on the basis of aerodynamic investigations of the aircraft equipped with its static pressure intake or intakes and of flight trials. This results in a correction of the static pressure measurement which can be carried out by calculation according to the schematic of FIG. 2. This correction is easy to implement in a system of back-up instruments as long as it includes an electronic portion enabling it to be endowed with a degree of calculational power. Specifically, this does not affect its safety of operation since it already has at its disposal measurements of the total pressure $P_T$ and of the static pressure $P_s$ with which it is provided by its own pressure probes.

A second approximation, less coarse than the first, consists in taking into consideration not only the influence of the Mach number but also that of the aerodynamic angle of incidence of the aircraft. This amounts to writing that the difference $\delta_{P_s}$ between the measured static pressure $P_s$ and the actual static pressure $P_{s\infty}$ is a function of the ratio of the total pressure $P_T$ to the measured static pressure $P_s$, of the dynamic pressure $P_T - P_s$ and of the aerodynamic angle of incidence $\alpha$ of the aircraft:

$$\delta_{P_s} = f_2(P_T/P_s, P_T - P_s, \alpha)$$

which function is defined by table of values with two inlets, established on the basis of aerodynamic investigations of the aircraft equipped with its own static pressure intake or intakes and of flight trials. This results in a correction of the static pressure measurement considerably improving the accuracy of the pressure altitude indication.

Such a correction is made by the calculators of the pilot's and of the copilot's systems of main instruments which derive the Mach number from measurements of total and static pressure originating from pressure probes specific to each system and which receive the value of the aerodynamic angle of incidence from incidence probes or vanes disposed on the flanks of the aircraft.

It was not done hitherto in the system of back-up instruments when this system was of purely mechanical and pneumatic design. It becomes envisageable with the introduction of an electronic portion into the back-up instrument system but the need to know the aerodynamic angle of incidence poses a problem since it is not possible to use the indications of the incidence probes for reasons of safety of operation. Specifically, the safety of operation requirements of a system of back-up instruments prevent the use of sensors placed on the outside of the aircraft, incorporating moving parts or requiring an electrical link since these sensors may be out of use in the event of avionic failure and may even induce failures in the system of back-up instruments by propagation of a lightning strike.

In order to make possible, in a system of back-up instruments, compensation of the error in the measurement of the static pressure dependent on the aerodynamic angle of incidence, without thereby reducing the safety of operation of such a system, it is proposed that the value of the aerodynamic angle of incidence be obtained from information which is already at the disposal of the system of back-up instruments, thus avoiding any recourse to an incidence probe mounted on the outside of the fuselage of the aircraft.

To do this, it is noted that the system of back-up instruments is already furnished with all the information required for determining the aerodynamic angle of incidence. Specifically, in stabilized flight, the aerodynamic angle of incidence $\alpha$ is equal to the difference between the angle of pitch $\theta$ of the aircraft and the slope angle of its path, both of which can be derived from information already in the possession of a system of back-up instruments.

The angle of pitch $\theta$ forms part of the attitude information delivered by the system of back-up instruments.

The slope angle of the path is equal to the arcsine of the ratio of the vertical speed $V_z$ of the aircraft to its speed $V_t$ over its path. Now, the vertical speed $V_z$ of the aircraft can be obtained by taking a derivative with respect to time of the pressure altitude information delivered by the system of back-up instruments whilst the speed $V_t$ of the aircraft over its path can be obtained from the information regarding conventional speed and pressure altitude also provided by the system of back-up instruments, by applying the well known laws of St Venant.

FIG. 3 summarizes, in a schematic, the processing method arrived at in order to compensate, in a system of safety instruments endowed with some electronic portion affording it calculational capabilities, for the error in the static pressure measurement dependent on the Mach number and on the aerodynamic angle of incidence and to improve the accuracy of the pressure altitude indication without thereby reducing the safety of operation.

Figure 4:
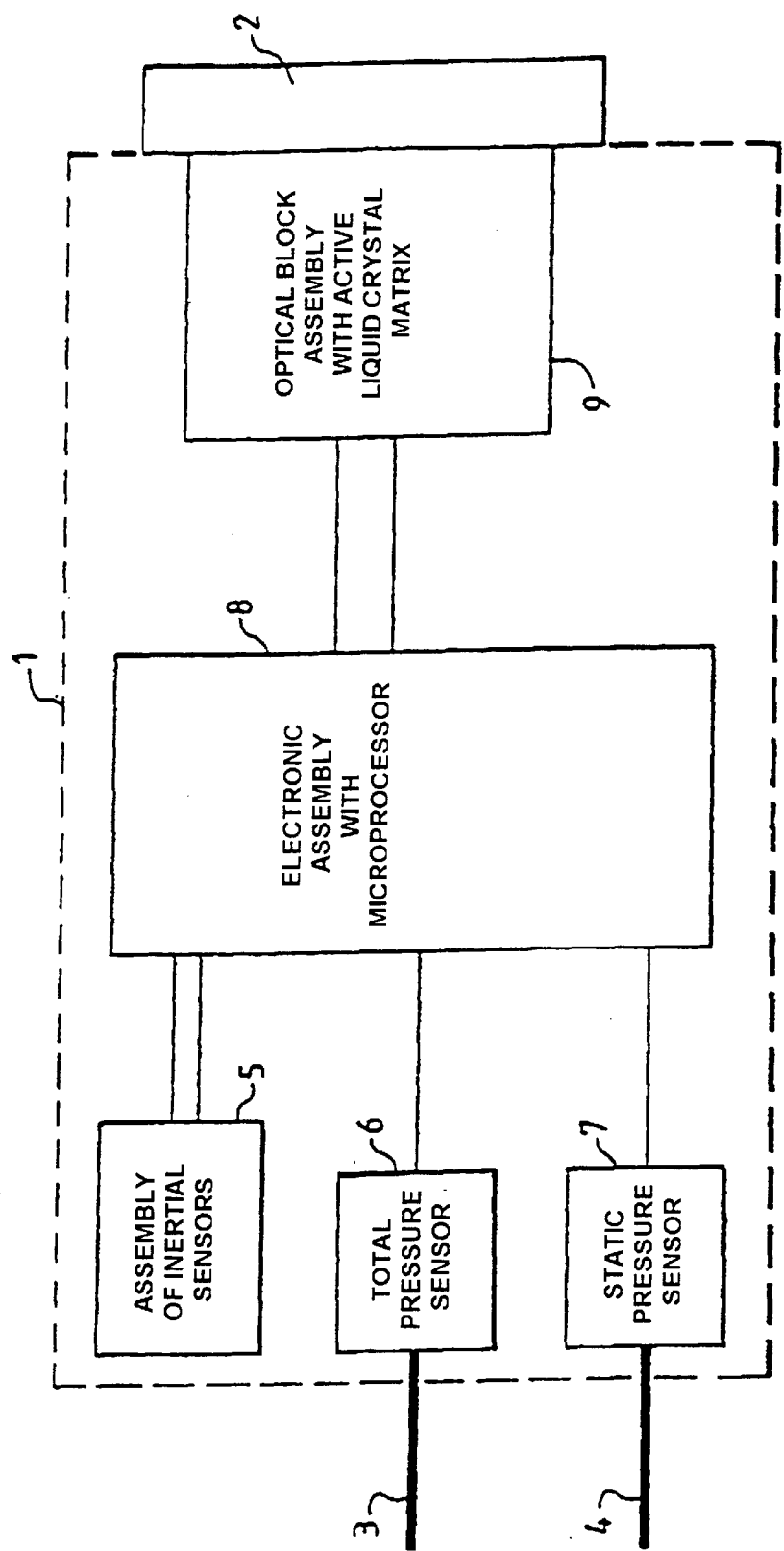

FIG. 4 diagrammatically illustrates the architecture of a system of combined back-up instruments for aircraft with compensation of error in the static pressure measurement as a function of the Mach number and of the aerodynamic angle of incidence.

This system of combined back-up instruments takes the form of a fairly elongated monoblock chassis 1 together with a liquid crystal display 2 occupying the major part of its front face and on its rear face two pneumatic intakes 3, 4 intended to be connected up by electrically insulating ducts to probes for measuring total pressure and static pressure tucked away on the outside of the aircraft as well as an electrical socket (not represented) with several contacts for the power supply and auxiliary control functions. The interior of the chassis 1 is subdivided into three main compartments:

a rear compartment which encloses: an electronic portion for measuring inertial quantities 5 which is equipped with an assembly of inertial sensors, associated with the three axes, for sensing angular velocities, accelerations or inclinations, an electronic portion for measuring total pressure 6 equipped with an electronic pressure sensor mounted on the pneumatic intake intended to be connected up to a probe for measuring total pressure and an electronic portion for measuring static pressure 7 equipped with an electronic pressure sensor mounted on the pneumatic intake intended to be connected up to a probe for measuring static pressure.

a central compartment occupied by an electronic assembly with microprocessor 8 which receives the information from the various measurement portions 5, 6, 7, digitizes them and processes them so as to derive therefrom indications of pressure altitude, of conventional speed and of attitude, and a front compartment occupied by an electronic assembly 9 for managing the liquid crystal display ensuring the presentation on the display of the various indications provided by the electronic assembly with microprocessor 8 of the central compartment.

The electronic assembly with microprocessor 8 is programmed, so as to perform on the information arising from the various measurement portions 5, 6, 7 two kinds of operations:

on the one hand, the customary processing and calculational operations making it possible to derive, from the measurements of total pressure and of static pressure as well as from the inertial measurements, a standard altitude indication or pressure altitude, a conventional speed indication and attitude indications (angles of pitch and of roll) regularly reupdated, and on the other hand, calculational operations making it possible to derive from the latest pressure altitude, conventional speed and roll attitude indications obtained, an indication of aerodynamic angle of incidence, calculational operations making it possible to derive from the latest total pressure and static pressure information available a Mach number indication, and an error correction operation on the forthcoming static pressure measurement, taking account of the indications obtained regarding the aerodynamic angle of incidence and the Mach number.

By virtue of the correction made regarding the total pressure measurement as a function of the aerodynamic angle of incidence of the aircraft, it is possible to improve the accuracy of the pressure altitude indication given by back-up instruments by an order of magnitude without increasing the cost thereof or reducing the safety of operation thereof.

What is claimed is:

1. Combined back-up instruments for aircraft delivering indications regarding the conventional speed, the standard altitude and the attitude of the aircraft and accordingly comprising:

two pneumatic inlets for measuring pressure, one for the total pressure, intended to be connected up to a total pressure probe mounted on the aircraft, and the other for the static pressure, intended to be connected up to a static pressure probe, an electronic portion for measuring total pressure equipped with an electronic pressure sensor connected up to the pneumatic inlet dedicated to the total pressure, an electronic portion for measuring static pressure equipped with an electronic pressure sensor connected up to the pneumatic inlet for static pressure, an electronic portion for inertial measurements, equipped with gyrometric and accelerometric or inclinometric inertial sensors, an electronic calculator deducing an indication of conventional speed from the total pressure and static pressure information provided by the electronic portions for measuring total pressure and static pressure, an indication of standard altitude from the static pressure information provided by the electronic portion for measuring static pressure and indications regarding the attitude of the aircraft (angle of pitch and angle of roll) relative to a vertical reference direction from the information provided by the electronic portion for inertial measurements, optoelectronic means of display of the indications of conventional speed, of standard altitude and of attitude which are provided by the electronic calculator, these combined back-up instruments being characterized in that the electronic calculator furthermore comprises:

electronic means for computing the aerodynamic angle of incidence of the aircraft operating on the basis of the indication of pitch attitude (angle of pitch of the aircraft), of the indication of conventional speed and of the indication of pressure altitude which are delivered by the electronic calculator itself, and electronic means of correcting the static pressure information provided by the electronic portion for measuring static pressure taking into account a correction coefficient dependent on the indication of aerodynamic angle of incidence of the aircraft as delivered by the electronic means for computing the aerodynamic angle of incidence.

2. Combined back-up instruments for aircraft, according to claim 1, characterized in that the electronic calculator furthermore comprises electronic means for computing the Mach number operating on the basis of the ratio of the total pressure derived from the total pressure information provided by the electronic portion for measuring total pressure to the static pressure derived from the static pressure information and provided by the electronic portion for measuring static pressure, the electronic means of correcting the static pressure information provided by the electronic portion for static pressure taking into account a correction coefficient dependent both on the indication of aerodynamic angle of incidence a of the aircraft as delivered by the electronic means of computing the aerodynamic angle of incidence and of the Mach number indication delivered by the electronic means of computing the Mach number.

* * * * *

UNITED STATES PATENT AND TRADEMARK OFFICE
CERTIFICATE OF CORRECTION

PATENT NO. : 6,564,628 B1  Page 1 of 1
DATED : May 20, 2003
INVENTOR(S) : Leblond et al.

It is certified that error appears in the above-identified patent and that said Letters Patent is hereby corrected as shown below:

Title page,
Item [75], Inventors, should read

-- [75] Inventors: Henri Leblond, Versailles (FR);
  Jean-René Chevalier, Cenon S/Vienne (FR); Edouard Escobar, Villiers S/Loir (FR) --

Item [73], Assignee, should read -- [73] Assignee: Thomson-CSF Sextant, Velizy Villacoublay (FR) --

Signed and Sealed this

Second Day of September, 2003

JAMES E. ROGAN
*Director of the United States Patent and Trademark Office*